J. G. E. Larned,
Steam-Boiler Water-Tube.

Nº 23,093. Patented Mar. 1, 1859.

3 Sheets, Sheet 1.

Witnesses:

Inventor:

J. G. E. Larned,
Steam-Boiler Water-Tube.
N° 23,093.  
3 Sheets. Sheet 2.  
Patented Mar. 1, 1859.
Fig: 3.
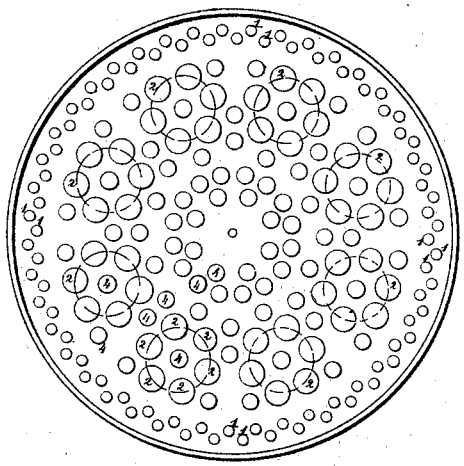
Fig: 6.
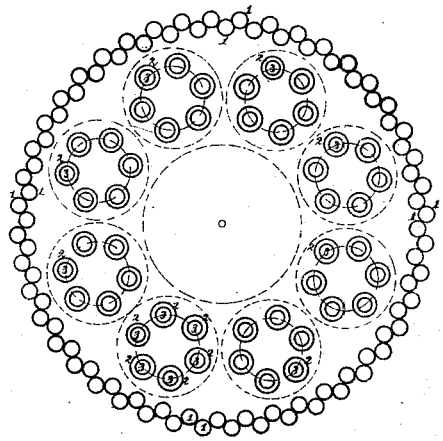
Fig: 4.
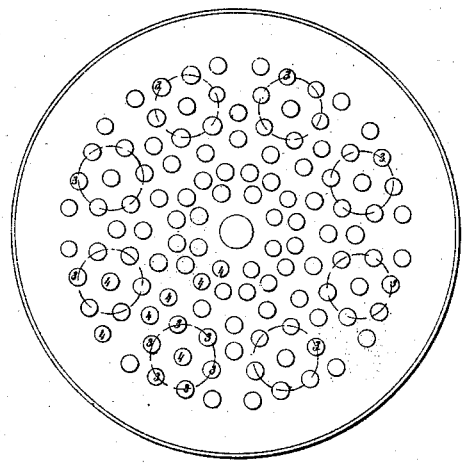
Fig: 5.
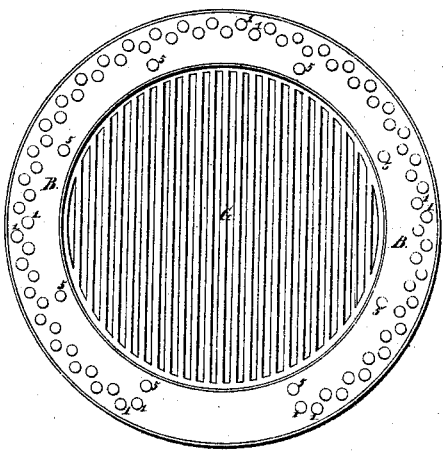
Witnesses:
Inventor:

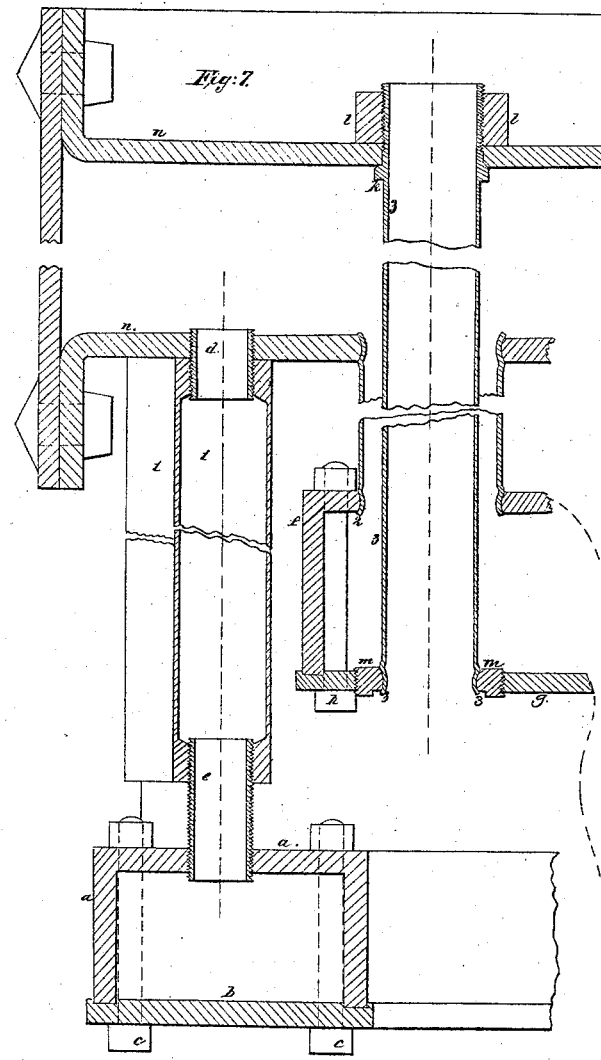
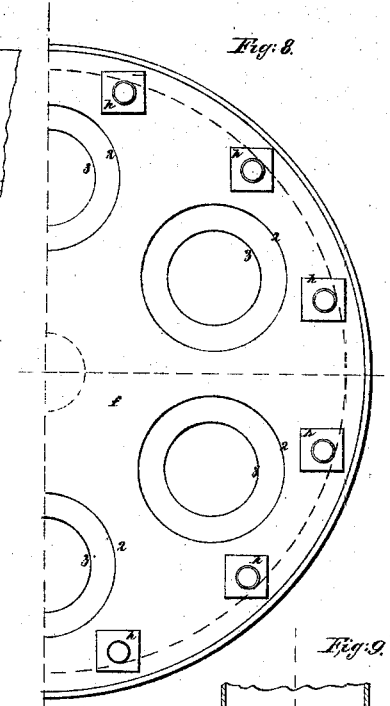
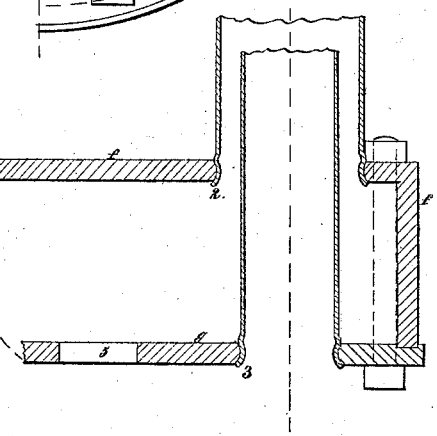

UNITED STATES PATENT OFFICE.

JOSEPH G. E. LARNED, OF BROOKLYN, NEW YORK.

IMPROVED BOILER FOR GENERATING STEAM.

Specification forming part of Letters Patent No. 23,093, dated March 1, 1859.

*To all whom it may concern:*

Be it known that I, JOSEPH G. E. LARNED, of Brooklyn, in Kings county, in the State of New York, have invented a new and useful Improvement in Steam-Boilers; and I do hereby declare that the following is a full, clear, and exact description thereof, reference being had to the annexed drawings, making a part of this specification, in which—

Figure 1:
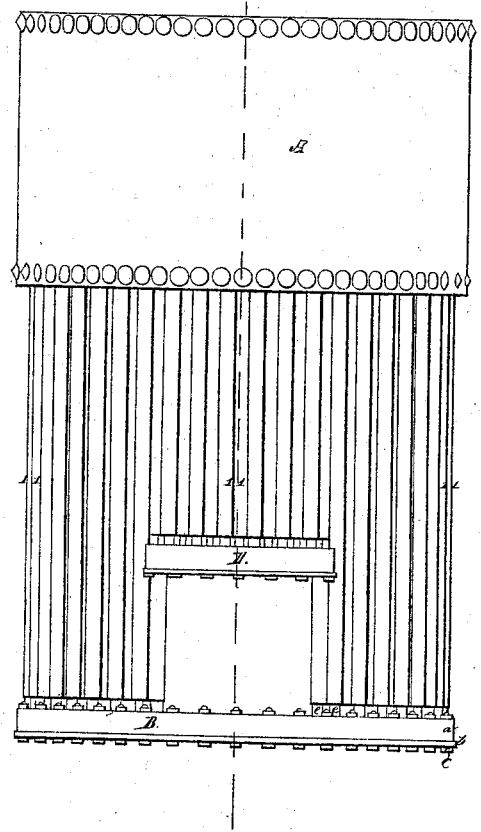
Figure 2:
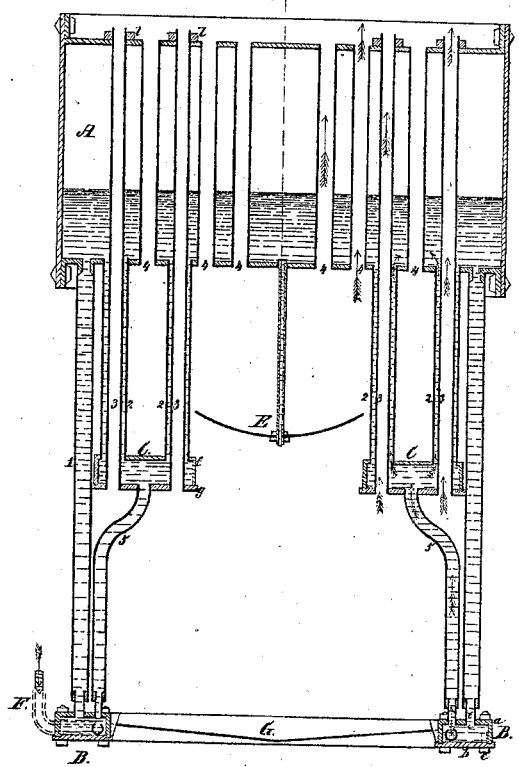

Figure 1 is a front elevation of said improved boiler; Fig. 2, a vertical section; Fig. 3, a plan of the lower, and Fig. 4 of the upper, tube-sheet of the steam-drum; Fig. 5, a plan of the water-bottom and grate; Fig. 6, a horizontal section through the red or dotted line in Figs. 1 and 2; Figs. 7, 8, and 9, full-size drawings showing certain details in the construction, as hereinafter explained, the same letters and numbers referring to like parts in each of said figures, except that the numbers which in Figs. 1, 2, 6, 7, and 9 designate the different classes of tubes used in the remaining figures designate the holes for the insertion of such tubes, respectively.

A is the steam-drum, composed of a cylindrical shell closed at the ends by an upper and lower tube-sheet flanged and riveted to it in the usual manner.

B is a water-bottom composed of the flanged ring *a*, Fig. 7, and the annular plate *b*, properly fitted to one another and put together by the bolts *c*, the central or open space within being filled by the grate G. The furnace or fire-box, occupying the space between the grate and the steam-drum, is inclosed by means of the water-tubes numbered 1, standing side by side in close contact and opening into the water-bottom below and the steam-drum above. These are ordinary boiler-tubes cut a little shorter than the intended height of the furnace and terminating in the necks or shorter tubes *d* and *e*, Fig. 7, by means of which they are inserted, the diameter of the latter being so much less than that of the tubes as to leave a sufficient thickness of iron between the adjacent perforations of the sheet, as seen in Figs. 3 and 5. As shown in the figures, *d* and *e* are nipples forming screw-joints in the respective sheets; but they may be thimbles expanded into the plates in the usual manner. In either case the caliber of the tubes is reduced to the required diameter by welding in rings at the ends or other appropriate means. The tubes over the door are received into the box D, which is in form a segment of the water-bottom of sufficient length, composed, like that, of a flanged part and a plate put together with bolts and connected with it by the short tubes seen on each side of the doorway. A thin casing of sheet-iron (not shown in the figure) completes the inclosure. The smoke top and chimney, steam-pipe, and other mountings are also omitted in the drawings.

C represents water-chambers occupying, with the connecting-tubes 2 and 3, the upper parts of the furnace, the whole constituting the annular part or main steam-generating portion of the boiler. These tubes are arranged in pairs, one within the other. The larger, numbered 2, are water-tubes inserted into the lower sheet of the steam-drum and the upper sheets of the water-chambers. Each of these is traversed by one of the smaller tubes, numbered 3, leaving of course only the annular space between the two (best seen in section in Fig. 6, the water-spaces being colored) to be occupied by water. The tubes 3 are air-tubes inserted into the lower sheet of the water-chambers and the upper sheet of the steam-drum and opening a passage from the fire-box to the smoke top. The tubes numbered 4 are also air-tubes connecting in the usual way the upper and lower tube-sheets of the steam-drum. The total flue area is intended to be about equally divided between the classes of tubes numbered 3 and 4.

The circulation of water among the annular tubes is secured by the supply-tubes 5, connecting the chambers C with the water bottom B. The feed-water may be divided into the supply-tubes, if it is thought desirable, by continuing the feed-pipe F in a coil around the water-bottom, with openings under or into the mouths of the supply-pipes, as indicated in Fig. 2.

Instead of the small chambers C, a single large water-chamber may be used, into which the whole number of annular tubes may be received, with thimbles or short tubes through it, properly placed to admit and distribute the hot air among the tubes 2. Where the small chambers are used, as shown in the drawings, a deflector E may be placed in the central portion to direct the hot-air currents among the larger or outer tubes.

In making the chambers C the steam-joint is formed, as in the water-bottom, by fitting the edges of the flanged part *f* to the plain plate *g* and bringing them together by means of the bolts *h*. By this method a very perfect steam-joint is formed, with the further advantage that in case of necessity the lower plate may be taken off and replaced. The flanged part, both in the chambers C and in the water-bottom, may be either of boiler, iron or a brass or malleable-iron casting. If the latter, lugs may be left inside to take the bolts; or two plain sheets may be used, the flange on the upper being replaced by a hoop, each edge of which is fitted to grooves in the plates and the whole put together by bolts and nuts, as already shown.

The tubes numbered 2 and 4 are inserted in the usual way—that is, by riveting or expanding them into the respective sheets. In the tubes numbered 3 I have resorted to a different method, (shown in full detail in the vertical section in Fig. 7,) it being important that these tubes should admit of being taken out and put back without injury, so as to allow of access to the ends of the tubes 2, and for other purposes, and a tube inserted by the ordinary method of expansion being necessarily destroyed in removing it. In one of the two sheets into which the tube is to be inserted a hole is drilled and tapped large enough to pass the larger tube 2, which hole is then bushed with the brass screw-plug *m*, which has a hole of the right size to permit the tube 3 to be expanded into it. The opposite end of the tube has a collar *k* welded on it, which is turned down to fit the hole and countersink in the tube sheet, and a thread is cut on the end to take the lock-nut *l*, by turning which, before the other end of the tube is made fast, a steam-joint is made between the shoulder and the countersink on the inner or steam side of the sheet. The bush *m* is then driven home, and the free end of the tube, after being trimmed to the right length, is expanded into it and made fast to it. If now the lock-nut *l* be taken off, we have only to unscrew the bush *m*, and the whole tube will be drawn out unharmed, giving free access for the purpose of examination, repairs, &c., to the steam-drum on one side and to the interior of the chamber C on the other. It may be remarked that when the small water-chambers are used the bushes may be dispensed with and the final expansion made directly into the lower plate, as in Figs. 2 and 9, as the small number of tubes entering the plate could without material inconvenience be withdrawn together.

I do not consider it necessary to point out the various modifications of which the general arrangement I have described is susceptible, or to enlarge upon the advantages secured by it. It must suffice to point out briefly its two leading peculiarities and their practical results. These are, first, the multiplication of heating-surface relative to the amount of water to be acted on by the use of the annular tubes, and, second, the substitution for the ordinary boiler-shell, except in the steam-drum, of the wall of tubes in close contact, except near the point of insertion, to inclose the interior spaces. By increasing the heating-surface we increase the evaporative power of the boiler; by limiting the amount of water we increase its activity. By means of the inclosing tubes we reduce largely the part which adds most to the weight and least to the effect, the thin metal of tubes but little exceeding a sixteenth of an inch in thickness taking the place of the boiler-iron, never less and often much more than a quarter of an inch thick, to say nothing of the laps, rivets, and stay-bolts, the fire-box surface at the same time being increased in the proportion of the semi-circumference of the tubes to the diameter. The weight of a boiler constructed on this principle need not exceed seven pounds per foot of fire-surface, so that within given limits of size and weight much greater evaporative power can be obtained and more quickly brought into action than in any form of boiler in common use which is known to me. The superior strength and safety attained at the same time is also a most noticeable fact, which nevertheless must be passed with only this allusion.

I am aware that a furnace has been constructed of rows of tubes set side by side, but not in close contact, the tube insertions being of the full size of the tube, so that spaces were left between adjacent tubes to be filled up by some appropriate means; but the forming of a furnace by means of continuous wall or palisade of upright tubes set side by side in close contact and inserted in the method I have described I believe to be entirely novel and claim as my invention. The annular arrangement taken by itself—that is, the use of tubes arranged in pairs, one within the other—I do not claim as my invention, being aware that it has been previously used for other purposes than steam-boilers, and also for steam-boilers in a different arrangement and combination. I claim it therefore only in the combination in which it is here presented substantially as I have described it—that is, in combination with inclosing tubes to form the furnace or fire-box—and for the purpose of this claim I regard it as immaterial whether the inclosing tubes are inserted by necks and set close together or stand so far apart as is necessary when the perforations are made of the full size of the tube, believing that the combination of the inclosing tubes in whichever method inserted with tubes annularly arranged is novel and original with myself. And as a part of the annular arrangement as described I also believe and claim that my method of inserting the innermost of the tubes arranged in pairs, so as to make them removable at pleasure, is novel and original with myself.

To recapitulate, therefore, what I claim as my invention, and desire to secure by Letters Patent, is—

1. The substitution for the parallel or concentric sheets of boiler-plate ordinarily used to form the fire-box of steam-boilers of a continuous row or rows of upright water-tubes set side by side to connect the steam-drum or water-space above the fire with a water-bottom below it in such way as to form by themselves a water-jacket, said tubes being inserted in the sheet above and below by means of necks or smaller continuations, the diameter of which is so much less than that of the tubes as to leave a sufficient thickness of metal between adjacent perforations of the sheet when the tubes are placed near enough together to answer the purpose of inclosure, expressly disclaiming, however, the use of such necks or smaller continuations in themselves considered, or for any other purpose or in any other arrangement than that herein set forth.

2. The combination of rows of water-tubes set side by side to inclose the furnace, with tubes arranged annularly to give increased surface without reference to the particular method of inserting the inclosing or arranging the annular tubes.

3. The method of inserting the innermost of the tubes when arranged in pairs, one within the other, as described, so that they may be taken out and put back at pleasure and without injury by means of a screw or lock-nut joint at one end and a combined screw and expansion-joint at the other.

JOS. G. E. LARNED.

Witnesses:
JOHN H. BIRD,
S. D. LAW.